United States Patent
Phillips

(10) Patent No.: US 9,777,815 B2
(45) Date of Patent: Oct. 3, 2017

(54) 3-MODE FRONT WHEEL DRIVE AND REAR WHEEL DRIVE CONTINUOUSLY VARIABLE PLANETARY TRANSMISSION

(71) Applicant: Dana Limited, Maumee, OH (US)

(72) Inventor: Andrew W. Phillips, Rochester, MI (US)

(73) Assignee: Dana Limited, Maumee, OH (US)

( * ) Notice: Subject to any disclaimer, the term of this patent is extended or adjusted under 35 U.S.C. 154(b) by 57 days.

(21) Appl. No.: 14/896,304

(22) PCT Filed: Jun. 5, 2014

(86) PCT No.: PCT/US2014/041124
§ 371 (c)(1),
(2) Date: Dec. 4, 2015

(87) PCT Pub. No.: WO2014/197711
PCT Pub. Date: Dec. 11, 2014

(65) Prior Publication Data
US 2016/0131235 A1 May 12, 2016

Related U.S. Application Data

(60) Provisional application No. 61/832,058, filed on Jun. 6, 2013.

(51) Int. Cl.
*F16H 37/08* (2006.01)
*F16H 37/02* (2006.01)
(Continued)

(52) U.S. Cl.
CPC .......... *F16H 37/022* (2013.01); *F16H 15/01* (2013.01); *F16H 15/52* (2013.01); *F16H 37/08* (2013.01);
(Continued)

(58) Field of Classification Search
None
See application file for complete search history.

(56) References Cited

U.S. PATENT DOCUMENTS 1,063,244 A 6/1913 Ludwig
1,215,969 A 2/1917 Thomas
(Continued)

FOREIGN PATENT DOCUMENTS

AU 2011224083 A1 10/2011
CN 101392825 A 3/2009
(Continued)

OTHER PUBLICATIONS

PCT/US2015/64087 International Search Report and Written Opinion dated Feb. 11, 2016.
(Continued)

*Primary Examiner* — Justin Holmes
(74) *Attorney, Agent, or Firm* — Marshall & Melhorn, LLC

(57) ABSTRACT

A front wheel drive or rear wheel drive continuously variable transmission is provided having an input shaft, an output shaft, a continuously variable tilting ball planetary variator, a compound planetary gearset assembly having first, second, third, and fourth rotating elements, and a plurality of torque transmitting devices. The compound planetary gearset assembly has a simple single pinion gearset and a compound double pinion gearset, having fixedly connected planetary carriers and fixedly connected ring gears, creating a joint planetary gear carrier and joint ring gear. The outer planetary gears engage the ring gear which drives the output shaft. Selective torque transmitting devices include clutches and braking clutches.

14 Claims, 4 Drawing Sheets

(51) Int. Cl.
  *F16H 15/52*  (2006.01)
  *F16H 15/01*  (2006.01)
(52) U.S. Cl.
  CPC . *F16H 37/0853* (2013.01); *F16H 2037/0886* (2013.01)

(56) References Cited

U.S. PATENT DOCUMENTS

| | | |
|---|---|---|
| 1,526,140 A | 2/1925 | Gruver |
| 2,019,006 A | 10/1935 | Ferrarl |
| 2,060,884 A | 11/1936 | Madle |
| 2,148,759 A | 2/1939 | Grand |
| 2,405,201 A | 8/1946 | Franck |
| 2,660,897 A | 12/1953 | Neidhart et al. |
| 2,729,118 A | 1/1956 | Emslie |
| 2,931,235 A | 4/1960 | Hayward |
| 3,203,278 A | 8/1965 | General |
| 3,376,633 A | 4/1968 | Wesley |
| 3,407,687 A | 10/1968 | Hayashi |
| 3,470,720 A | 10/1969 | Phillip et al. |
| 3,505,718 A | 4/1970 | Carl |
| 3,583,060 A | 6/1971 | Maurice |
| 3,688,600 A | 9/1972 | Allan |
| 3,765,270 A | 10/1973 | Lemieux |
| 3,774,280 A | 11/1973 | Eklund et al. |
| 3,831,245 A | 8/1974 | Amos |
| 3,894,559 A | 7/1975 | DePuy |
| 4,046,988 A | 9/1977 | Okuda et al. |
| 4,056,988 A | 11/1977 | Kubo et al. |
| 4,187,709 A | 2/1980 | Legate et al. |
| 4,226,140 A | 10/1980 | Gaasenbeek |
| 4,333,358 A | 6/1982 | Grattapaglia |
| 4,344,336 A | 8/1982 | Carriere |
| 4,360,090 A | 11/1982 | Wonn |
| 4,368,572 A | 1/1983 | Kanazawa et al. |
| 4,464,952 A | 8/1984 | Stubbs |
| 4,693,134 A | 9/1987 | Kraus |
| 4,731,044 A | 3/1988 | Mott |
| 4,756,211 A | 7/1988 | Fellows |
| 4,784,017 A | 11/1988 | Johnshoy |
| 4,856,371 A | 8/1989 | Kemper |
| 4,856,374 A | 8/1989 | Kreuzer |
| 4,950,208 A | 8/1990 | Tomlinson |
| 4,963,122 A | 10/1990 | Ryan |
| 4,963,124 A | 10/1990 | Takahashi et al. |
| 5,109,962 A | 5/1992 | Sato |
| 5,168,778 A | 12/1992 | Todd et al. |
| 5,217,412 A | 6/1993 | Indlekofer et al. |
| 5,230,670 A | 7/1993 | Hibi |
| 5,238,460 A | 8/1993 | Esaki et al. |
| 5,318,486 A | 6/1994 | Lutz |
| 5,390,759 A | 2/1995 | Gollner |
| 5,401,221 A | 3/1995 | Fellows et al. |
| 5,427,579 A * | 6/1995 | Kanehara ............ F16H 61/66259 474/28 |
| 5,520,588 A | 5/1996 | Hall, III |
| 5,527,231 A | 6/1996 | Seidel et al. |
| 5,577,423 A | 11/1996 | Mimura |
| 5,599,251 A | 2/1997 | Beim et al. |
| 5,659,956 A | 8/1997 | Braginsky et al. |
| 5,683,322 A | 11/1997 | Meyerle |
| 5,726,353 A | 3/1998 | Matsuda et al. |
| 5,730,678 A | 3/1998 | Larkin |
| 5,766,105 A | 6/1998 | Fellows et al. |
| 5,776,028 A | 7/1998 | Matsuda et al. |
| 5,800,303 A | 9/1998 | Benford |
| 5,860,888 A | 1/1999 | Lee |
| 5,915,801 A | 6/1999 | Taga et al. |
| 5,961,415 A | 10/1999 | Justice et al. |
| 5,967,931 A * | 10/1999 | Hoge ................... B60K 17/348 180/247 |
| 5,971,883 A | 10/1999 | Klemen |
| 5,996,226 A | 12/1999 | Gibbs |
| 6,009,365 A | 12/1999 | Takahara et al. |
| 6,036,616 A | 3/2000 | McCarrick et al. |
| 6,045,477 A | 4/2000 | Schmidt |
| 6,053,839 A | 4/2000 | Baldwin et al. |
| 6,059,685 A | 5/2000 | Hoge et al. |
| 6,071,208 A | 6/2000 | Koivunen |
| 6,080,080 A | 6/2000 | Bolz et al. |
| 6,083,135 A | 7/2000 | Baldwin et al. |
| 6,086,504 A | 7/2000 | Illerhaus |
| 6,089,287 A | 7/2000 | Welsh et al. |
| 6,095,942 A | 8/2000 | Yamaguchi et al. |
| 6,155,951 A | 12/2000 | Kuhn et al. |
| 6,217,474 B1 | 4/2001 | Ross et al. |
| 6,251,038 B1 | 6/2001 | Ishikawa et al. |
| 6,273,838 B1 | 8/2001 | Park |
| 6,342,026 B1 | 1/2002 | Takagi et al. |
| 6,358,178 B1 | 3/2002 | Wittkopp |
| 6,371,880 B1 | 4/2002 | Kam |
| 6,405,117 B1 | 6/2002 | Walenty et al. |
| 6,481,258 B1 | 11/2002 | Belinky |
| 6,554,735 B2 | 4/2003 | Kanazawa |
| 6,558,285 B1 | 5/2003 | Sieber |
| 6,585,619 B2 | 7/2003 | Henzler |
| 6,609,994 B2 | 8/2003 | Muramoto |
| 6,632,157 B1 | 10/2003 | Gierling et al. |
| 6,641,497 B2 | 11/2003 | Deschamps et al. |
| 6,645,106 B2 | 11/2003 | Goo et al. |
| 6,689,012 B2 | 2/2004 | Miller et al. |
| 6,705,964 B2 | 3/2004 | Nagai et al. |
| 6,719,659 B2 | 4/2004 | Geiberger et al. |
| 6,723,016 B2 | 4/2004 | Sumi |
| 6,726,590 B2 | 4/2004 | Henzler et al. |
| 6,733,412 B2 | 5/2004 | Kumagai et al. |
| 6,752,696 B2 | 6/2004 | Murai et al. |
| 6,793,603 B2 | 9/2004 | Teraoka et al. |
| 6,849,020 B2 | 2/2005 | Sumi |
| 6,866,606 B2 | 3/2005 | Ooyama |
| 6,949,045 B2 | 9/2005 | Wafzig et al. |
| 6,979,275 B2 | 12/2005 | Hiraku et al. |
| 6,986,725 B2 | 1/2006 | Morscheck |
| 7,033,298 B2 | 4/2006 | Usoro et al. |
| 7,074,154 B2 | 7/2006 | Miller |
| 7,086,981 B2 | 8/2006 | Ali et al. |
| 7,104,917 B2 | 9/2006 | Klemen et al. |
| 7,128,681 B2 | 10/2006 | Sugino et al. |
| 7,160,220 B2 | 1/2007 | Shinojima et al. |
| 7,186,199 B1 | 3/2007 | Baxter, Jr. |
| 7,217,214 B2 | 5/2007 | Morscheck et al. |
| 7,234,543 B2 | 6/2007 | Schaaf |
| 7,288,044 B2 | 10/2007 | Gumpoltsberger |
| 7,311,634 B2 | 12/2007 | Shim et al. |
| 7,335,126 B2 | 2/2008 | Tsuchiya et al. |
| 7,347,801 B2 | 3/2008 | Guenter et al. |
| 7,396,309 B2 | 7/2008 | Heitz et al. |
| 7,431,677 B2 | 10/2008 | Miller et al. |
| 7,470,210 B2 | 12/2008 | Miller et al. |
| 7,473,202 B2 | 1/2009 | Morscheck et al. |
| 7,485,069 B2 | 2/2009 | Jang et al. |
| 7,497,798 B2 | 3/2009 | Kim |
| 7,588,514 B2 | 9/2009 | McKenzie et al. |
| 7,637,838 B2 | 12/2009 | Gumpoltsberger |
| 7,672,770 B2 | 3/2010 | Inoue et al. |
| 7,686,729 B2 | 3/2010 | Miller et al. |
| 7,717,815 B2 | 5/2010 | Tenberge |
| 7,727,107 B2 | 6/2010 | Miller |
| 7,780,566 B2 | 8/2010 | Seo |
| 7,874,153 B2 | 1/2011 | Behm |
| 7,878,935 B2 | 2/2011 | Lahr |
| 7,951,035 B2 | 5/2011 | Platt |
| 7,980,972 B1 | 7/2011 | Starkey et al. |
| 8,029,401 B2 | 10/2011 | Johnson |
| 8,052,569 B2 | 11/2011 | Tabata et al. |
| 8,062,175 B2 | 11/2011 | Krueger et al. |
| 8,066,614 B2 | 11/2011 | Miller et al. |
| 8,142,323 B2 | 3/2012 | Tsuchiya et al. |
| 8,226,518 B2 | 7/2012 | Parraga |
| 8,257,216 B2 | 9/2012 | Hoffman |
| 8,257,217 B2 | 9/2012 | Hoffman |
| 8,287,414 B2 | 10/2012 | Weber et al. |
| 8,313,404 B2 | 11/2012 | Carter et al. |
| 8,376,903 B2 | 2/2013 | Pohl et al. |

(56) References Cited

U.S. PATENT DOCUMENTS

| | | | |
|---|---|---|---|
| 8,382,636 B2 | 2/2013 | Shiina et al. |
| 8,447,480 B2 | 5/2013 | Usukura |
| 8,469,856 B2 | 6/2013 | Thomassy |
| 8,545,368 B1 | 10/2013 | Davis et al. |
| 8,594,867 B2 | 11/2013 | Heap et al. |
| 8,622,871 B2 | 1/2014 | Hoff |
| 8,639,419 B2 | 1/2014 | Roli et al. |
| 8,668,614 B2 | 3/2014 | Sherrill et al. |
| 8,678,975 B2 | 3/2014 | Koike |
| 8,870,711 B2 | 10/2014 | Pohl et al. |
| 8,888,643 B2 | 11/2014 | Lohr et al. |
| 8,888,646 B2 * | 11/2014 | Lundberg | F16H 37/022 475/216 |
| 8,926,468 B2 | 1/2015 | Versteyhe et al. |
| 8,986,150 B2 | 3/2015 | Versteyhe et al. |
| 9,052,000 B2 | 6/2015 | Cooper |
| 9,109,679 B2 * | 8/2015 | Carey | F16H 37/022 |
| 9,114,799 B2 | 8/2015 | Tsukamoto et al. |
| 9,156,463 B2 | 10/2015 | Legner |
| 9,194,472 B2 | 11/2015 | Versteyhe et al. |
| 2002/0004438 A1 | 1/2002 | Toukura et al. |
| 2002/0094911 A1 | 7/2002 | Haka |
| 2003/0181280 A1 | 9/2003 | Elser et al. |
| 2003/0200783 A1 | 10/2003 | Shai |
| 2003/0213125 A1 | 11/2003 | Chiuchang |
| 2003/0216121 A1 | 11/2003 | Yarkosky |
| 2003/0228952 A1 | 12/2003 | Joe et al. |
| 2004/0058769 A1 | 3/2004 | Larkin |
| 2004/0061639 A1 | 4/2004 | Voigtlaender et al. |
| 2004/0166984 A1 | 8/2004 | Inoue |
| 2004/0167391 A1 | 8/2004 | Solar et al. |
| 2004/0171452 A1 | 9/2004 | Miller et al. |
| 2005/0102082 A1 | 5/2005 | Joe et al. |
| 2005/0137046 A1 | 6/2005 | Miller et al. |
| 2005/0153810 A1 | 7/2005 | Miller et al. |
| 2006/0094515 A1 | 5/2006 | Szuba et al. |
| 2006/0276294 A1 | 12/2006 | Coffey et al. |
| 2007/0032327 A1 | 2/2007 | Raghavan et al. |
| 2007/0042856 A1 | 2/2007 | Greenwood et al. |
| 2007/0072732 A1 | 3/2007 | Klemen |
| 2007/0096556 A1 | 5/2007 | Kokubo et al. |
| 2007/0149342 A1 * | 6/2007 | Guenter | F16H 37/086 475/214 |
| 2007/0270270 A1 | 11/2007 | Miller et al. |
| 2007/0275808 A1 | 11/2007 | Iwanaka et al. |
| 2008/0039273 A1 | 2/2008 | Smithson et al. |
| 2008/0103002 A1 | 5/2008 | Holmes |
| 2008/0185201 A1 | 8/2008 | Bishop |
| 2009/0017959 A1 | 1/2009 | Triller |
| 2009/0062064 A1 | 3/2009 | Kamada et al. |
| 2009/0112424 A1 | 4/2009 | Dahl et al. |
| 2009/0132135 A1 | 5/2009 | Quinn, Jr. et al. |
| 2009/0221391 A1 | 9/2009 | Bazyn et al. |
| 2009/0221393 A1 | 9/2009 | Kassler |
| 2009/0286651 A1 | 11/2009 | Tanaka et al. |
| 2009/0312137 A1 | 12/2009 | Rohs et al. |
| 2010/0056322 A1 | 3/2010 | Thomassy |
| 2010/0093479 A1 | 4/2010 | Carter et al. |
| 2010/0106386 A1 | 4/2010 | Krasznai et al. |
| 2010/0113211 A1 | 5/2010 | Schneider et al. |
| 2010/0137094 A1 | 6/2010 | Pohl |
| 2010/0141193 A1 | 6/2010 | Rotondo et al. |
| 2010/0244755 A1 | 9/2010 | Kinugasa et al. |
| 2010/0267510 A1 | 10/2010 | Nichols et al. |
| 2010/0282020 A1 | 11/2010 | Greenwood et al. |
| 2010/0304915 A1 | 12/2010 | Lahr |
| 2010/0310815 A1 | 12/2010 | Mendonca et al. |
| 2011/0015021 A1 | 1/2011 | Maguire et al. |
| 2011/0034284 A1 | 2/2011 | Pohl et al. |
| 2011/0152031 A1 | 6/2011 | Schoolcraft |
| 2011/0165982 A1 | 7/2011 | Hoffman et al. |
| 2011/0165985 A1 | 7/2011 | Hoffman et al. |
| 2011/0165986 A1 | 7/2011 | Hoffman et al. |
| 2011/0165987 A1 | 7/2011 | Hoffman et al. |
| 2011/0230297 A1 | 9/2011 | Shiina et al. |
| 2011/0300954 A1 | 12/2011 | Szuba et al. |
| 2011/0319222 A1 | 12/2011 | Ogawa et al. |
| 2012/0024991 A1 | 2/2012 | Pilch et al. |
| 2012/0035016 A1 | 2/2012 | Miller et al. |
| 2012/0040794 A1 | 2/2012 | Schoolcraft |
| 2012/0122624 A1 | 5/2012 | Hawkins, Jr. et al. |
| 2012/0142477 A1 | 6/2012 | Winter |
| 2012/0165154 A1 | 6/2012 | Wittkopp et al. |
| 2012/0244990 A1 | 9/2012 | Ogawa et al. |
| 2012/0309579 A1 | 12/2012 | Miller et al. |
| 2013/0096797 A1 | 4/2013 | Whitney et al. |
| 2013/0130859 A1 | 5/2013 | Lundberg et al. |
| 2013/0133965 A1 | 5/2013 | Books |
| 2013/0184115 A1 | 7/2013 | Urabe et al. |
| 2013/0190131 A1 | 7/2013 | Versteyhe et al. |
| 2013/0226416 A1 | 8/2013 | Seipold et al. |
| 2013/0303325 A1 | 11/2013 | Carey et al. |
| 2013/0304344 A1 | 11/2013 | Abe |
| 2013/0338888 A1 | 12/2013 | Long et al. |
| 2014/0223901 A1 | 8/2014 | Versteyhe et al. |
| 2014/0274540 A1 | 9/2014 | Schoolcraft |
| 2014/0274552 A1 | 9/2014 | Frink et al. |
| 2014/0329637 A1 | 11/2014 | Thomassy et al. |
| 2015/0024899 A1 | 1/2015 | Phillips |
| 2015/0051801 A1 | 2/2015 | Quinn, Jr. et al. |
| 2015/0111693 A1 | 4/2015 | Wang et al. |
| 2015/0142281 A1 | 5/2015 | Versteyhe et al. |
| 2015/0159741 A1 | 6/2015 | Versteyhe et al. |
| 2015/0198246 A1 | 7/2015 | Callaway et al. |
| 2015/0204429 A1 | 7/2015 | Versteyhe et al. |
| 2015/0204430 A1 | 7/2015 | Versteyhe et al. |
| 2015/0226294 A1 | 8/2015 | Ziech et al. |
| 2015/0226298 A1 | 8/2015 | Versteyhe et al. |
| 2015/0226299 A1 | 8/2015 | Cooper et al. |
| 2015/0252881 A1 | 9/2015 | Versteyhe |
| 2015/0354676 A1 | 12/2015 | Versteyhe et al. |
| 2016/0033021 A1 | 2/2016 | Cooper et al. |
| 2016/0047448 A1 | 2/2016 | Versteyhe et al. |
| 2016/0109001 A1 | 4/2016 | Schoolcraft |
| 2016/0123438 A1 | 5/2016 | Ziech et al. |
| 2016/0185353 A1 | 6/2016 | Honma et al. |
| 2016/0281828 A1 | 9/2016 | Haka |
| 2016/0290458 A1 | 10/2016 | Taskiran et al. |
| 2016/0298737 A1 | 10/2016 | Versteyhe et al. |

FOREIGN PATENT DOCUMENTS

| | | |
|---|---|---|
| CN | 101479503 A | 7/2009 |
| CN | 101617146 A | 12/2009 |
| CN | 102297255 A | 12/2011 |
| CN | 102338208 A | 2/2012 |
| CN | 202165536 U | 3/2012 |
| CN | 202392067 U | 8/2012 |
| DE | 1237380 B | 3/1967 |
| DE | 3245045 A1 | 6/1984 |
| DE | 102005010751 A1 | 9/2006 |
| EP | 0156936 A1 | 10/1985 |
| EP | 0210053 A2 | 1/1987 |
| EP | 1061288 A2 | 12/2000 |
| EP | 1174645 A2 | 1/2002 |
| EP | 2113056 B1 | 7/2012 |
| FR | 796188 A | 3/1936 |
| FR | 1030702 A | 6/1953 |
| FR | 1472282 A | 3/1967 |
| FR | 2185076 A5 | 12/1973 |
| FR | 2280451 A1 | 2/1976 |
| FR | 2918433 A1 | 1/2009 |
| GB | 1127825 A | 9/1968 |
| GB | 2196892 A | 5/1988 |
| GB | 2248895 A | 4/1992 |
| JP | H09119506 A | 5/1997 |
| JP | 2008180214 A | 8/2008 |
| JP | 2009058085 A | 3/2009 |
| JP | 2011153583 A | 8/2011 |
| WO | WO-2006002457 A1 | 1/2006 |
| WO | WO-2006041718 A2 | 4/2006 |
| WO | WO-2006109158 A1 | 10/2006 |
| WO | WO-2007046722 A1 | 4/2007 |
| WO | WO-2007051827 A1 | 5/2007 |

(56) References Cited

FOREIGN PATENT DOCUMENTS

| | | |
|---|---|---|
| WO | WO-2008101070 A2 | 8/2008 |
| WO | WO-2008103543 A1 | 8/2008 |
| WO | WO-2011011991 A1 | 2/2011 |
| WO | WO-2012008884 A1 | 1/2012 |
| WO | WO-2012177187 A1 | 12/2012 |
| WO | WO-2013109723 A1 | 7/2013 |
| WO | WO-2013123117 A1 | 8/2013 |
| WO | WO-2014039438 A2 | 3/2014 |
| WO | WO-2014039439 A1 | 3/2014 |
| WO | WO-2014039440 A1 | 3/2014 |
| WO | WO-2014039447 A1 | 3/2014 |
| WO | WO-2014039448 A2 | 3/2014 |
| WO | WO-2014039708 A1 | 3/2014 |
| WO | WO-2014039713 A1 | 3/2014 |
| WO | WO-2014039846 A2 | 3/2014 |
| WO | WO-2014039900 A1 | 3/2014 |
| WO | WO-2014039901 A1 | 3/2014 |
| WO | WO-2014078583 A1 | 5/2014 |
| WO | WO-2014124291 A1 | 8/2014 |
| WO | WO-2014151889 A2 | 9/2014 |
| WO | WO-2014159755 A2 | 10/2014 |
| WO | WO-2014159756 A2 | 10/2014 |
| WO | WO-2014165259 A1 | 10/2014 |
| WO | WO-2014179717 A1 | 11/2014 |
| WO | WO-2014179719 A1 | 11/2014 |
| WO | WO-2014186732 A1 | 11/2014 |
| WO | WO-2014197711 A1 | 12/2014 |
| WO | WO-2015059601 A1 | 4/2015 |
| WO | WO-2015073883 A1 | 5/2015 |
| WO | WO-2015073887 A1 | 5/2015 |
| WO | WO-2015073948 A2 | 5/2015 |
| WO | WO-2015195759 A2 | 12/2015 |
| WO | WO-2015200769 A1 | 12/2015 |
| WO | WO-2016094254 A1 | 6/2016 |

OTHER PUBLICATIONS

U.S. Appl. No. 13/743,951 Office Action dated Jan. 21, 2016.
PCT/US2014/065792 International Preliminary Report on Patentability dated Jun. 2, 2016.
PCT/US2014/065909 Written Opinion dated Jun. 6, 2016.
PCT/US2016/027496 International Search Report and Written Opinion dated Jul. 8, 2016.
U.S. Appl. No. 14/425,598 Office Action dated Jun. 14, 2016.
U.S. Appl. No. 14/425,842 Office Action dated Jul. 1, 2016.
U.S. Appl. No. 15/067,752 Office Action dated Jun. 30, 2016.
Co-pending U.S. Appl. No. 15/209,487, filed Jul. 13, 2016.
Co-pending U.S. Appl. No. 15/215,179, filed Jul. 20, 2016.
PCT/US2016/29853 International Search Report and Written Opinion dated Aug. 8, 2016.
U.S. Appl. No. 14/334,538 Office Action dated Jul. 29, 2016.
Co-pending U.S. Appl. No. 15/260,472, filed Sep. 9, 2016.
Co-pending U.S. Appl. No. 15/265,163, filed Sep. 14, 2016.
Co-pending U.S. Appl. No. 15/265,226, filed Sep. 14, 2016.
Co-pending U.S. Appl. No. 15/272,774, filed Sep. 22, 2016.
Co-pending U.S. Appl. No. 15/284,940, filed Oct. 4, 2016.
PCT/US2016/030930 International Search Report and Written Opinion dated Sep. 23, 2016.
PCT/US2016/038064 International Search Report and Written Opinion dated Sep. 7, 2016.
U.S. Appl. No. 14/425,600 Office Action dated Sep. 23, 2016.
U.S. Appl. No. 62/158,847, filed May 8, 2015.
PCT/US2016/045857 International Search Report and Written Opinion dated Oct. 13, 2016.
Co-pending U.S. Appl. No. 14/925,813, filed Oct. 28, 2015.
Fallbrook Technologies. 'NuVinci® Technology', Feb. 26, 2013; [retrieved on Jun. 5, 2014]. Retrieved from internet: <URL: https://web.archive.org/web/20130226233109/http://www.fallbrooktech.com/nuvinci-technology.
Moore et al. A Three Revolute Cobot Using CVTs in Parallel. Proceedings of IMECE (1999) 6 pgs.
PCT/US2013/021890 International Preliminary Report on Patentability dated Jul. 31, 2014.
PCT/US2013/021890 International Search Report dated Apr. 10, 2013.
PCT/US2013/026037 International Preliminary Report on Patentability dated Aug. 28, 2014.
PCT/US2013/026037 International Search Report dated Jul. 15, 2013.
PCT/US2013/057837 International Preliminary Report on Patentability dated Mar. 19, 2015.
PCT/US2013/057837 International Search Report and Written Opinion dated Mar. 31, 2014.
PCT/US2013/057838 International Preliminary Report on Patentability dated Mar. 19, 2015.
PCT/US2013/057838 International Search Report and Written Opinion dated Jan. 17, 2014.
PCT/US2013/057839 International Preliminary Report on Patentability dated Mar. 19, 2015.
PCT/US2013/057839 International Search Report and Written Opinion dated Feb. 6, 2014.
PCT/US2013/057866 International Preliminary Report on Patentability dated Mar. 19, 2015.
PCT/US2013/057866 International Search Report dated Feb. 11, 2014.
PCT/US2013/057868 International Preliminary Report on Patentability dated Mar. 19, 2015.
PCT/US2013/057868 International Search Report and Written Opinion dated Apr. 9, 2014.
PCT/US2013/058309 International Preliminary Report on Patentability dated Mar. 19, 2015.
PCT/US2013/058309 International Search Report and Written Opinion dated Feb. 11, 2014.
PCT/US2013/058318 International Preliminary Report on Patentability dated Mar. 19, 2015.
PCT/US2013/058318 International Search Report and Written Opinion dated Feb. 11, 2014.
PCT/US2013/058545 International Preliminary Report on Patentability dated Mar. 19, 2015.
PCT/US2013/058545 International Search Report and Written Opinion dated Feb. 19, 2014.
PCT/US2013/058615 International Preliminary Report on Patentability dated Mar. 19, 2015.
PCT/US2013/058615 International Search Report and Written Opinion dated Feb. 11, 2014.
PCT/US2013/058616 International Preliminary Report on Patentability dated Mar. 19, 2015.
PCT/US2013/058616 International Search Report and Written Opinion dated Feb. 11, 2014.
PCT/US2013/070177 International Preliminary Report on Patentability dated May 28, 2015.
PCT/US2013/070177 International Search Report and Written Opinion dated Apr. 14, 2014.
PCT/US2014/015352 International Search Report and Written Opinion dated May 27, 2014.
PCT/US2014/025001 International Preliminary Report on Patent ability dated Sep. 24, 2015.
PCT/US2014/025001 International Search Report and Written Opinion dated Jul. 14, 2014.
PCT/US2014/025004 International Preliminary Report on Patentability dated Oct. 1, 2015.
PCT/US2014/025004 International Search Report and Written Opinion dated Jul. 14, 2014.
PCT/US2014/025005 International Preliminary Report on Patentability dated Oct. 1, 2015.
PCT/US2014/025005 International Search Report and Written Opinion dated Jul. 14, 2014.
PCT/US2014/026619 International Preliminary Report on Patentability dated Sep. 24, 2015.
PCT/US2014/026619 International Search Report and Written Opinion dated Sep. 9, 2014.
PCT/US2014/036621 International Preliminary Report on Patentability dated Nov. 12, 2015.

(56) References Cited

OTHER PUBLICATIONS

PCT/US2014/036621 International Search Report and Written Opinion dated Sep. 4, 2014.
PCT/US2014/036623 International Preliminary Report on Patentability dated Nov. 12, 2015.
PCT/US2014/036623 International Search Report and Written Opinion dated Sep. 4, 2014.
PCT/US2014/038439 International Preliminary Report on Patentability dated Nov. 26, 2015.
PCT/US2014/038439 International Search Report and Written Opinion dated Sep. 30, 2014.
PCT/US2014/041124 International Preliminary Report on Patentability dated Dec. 17, 2015.
PCT/US2014/041124 International Search Report and Written Opinion dated Oct. 15, 2014.
PCT/US2014/065792 International Search Report and Written Opinion dated Apr. 9, 2015.
PCT/US2014/065796 International Preliminary Report on Patentability dated Nov. 6, 2015.
PCT/US2014/065796 International Search Report and Written Opinion dated Apr. 9, 2015.
PCT/US2014/065909 International Search Report and Written Opinion dated Feb. 19, 2015.
PCT/US2014/065909 Written Opinion dated Dec. 11, 2015.
PCT/US2015/36170 International Search Report and Written Opinion dated Dec. 17, 2015.
PCT/US2015/37916 International Search Report and Written Opinion dated Sep. 29, 2015.
U.S. Appl. No. 13/743,951 Office Action dated Aug. 19, 2015.
U.S. Appl. No. 13/743,951 Office Action dated Mar. 18, 2015.
U.S. Appl. No. 14/017,054 Office Action dated Aug. 27, 2014.
U.S. Appl. No. 14/017,054 Office Action dated Dec. 12, 2014.
U.S. Appl. No. 14/175,584 Office Action dated Apr. 2, 2015.
U.S. Appl. No. 14/175,584 Office Action dated Dec. 3, 2015.
U.S. Appl. No. 14/210,130 Office Action dated Nov. 20, 2015.
U.S. Appl. No. 14/426,139 Office Action dated Oct. 6, 2015.
U.S. Appl. No. 14/542,336 Office Action dated Nov. 25, 2015.
U.S. Appl. No. 60/616,399, filed Oct. 5, 2004.
U.S. Appl. No. 61/819,414, filed May 3, 2013.
Wong. The Temple of VTEC Asia Special Focus on the Multimatic Transmission. Temple of VTEC Asia. 2000.
Co-pending U.S. Appl. No. 15/067,427, filed Mar. 11, 2016.
Co-pending U.S. Appl. No. 15/067,752, filed Mar. 11, 2016.
U.S. Appl. No. 14/210,130 Office Action dated Jun. 7, 2016.
U.S. Appl. No. 14/378,750 Office Action dated Apr. 8, 2016.
U.S. Appl. No. 14/425,600 Office Action dated May 16, 2016.

* cited by examiner

| $r_i>r_o$ | $r_i=r_o$ | $r_i<r_o$ |
| --- | --- | --- |
| Underdrive | 1:1 | Overdrive |

3-MODE FRONT WHEEL DRIVE AND REAR WHEEL DRIVE CONTINUOUSLY VARIABLE PLANETARY TRANSMISSION

CROSS-REFERENCES TO RELATED APPLICATIONS

The present application is the National Phase Entry of International Application No. PCT/US2014/041124, filed Jun. 5, 2014, which claims the benefit of U.S. Provisional Patent Application No. 61/832,058, filed Jun. 6, 2013, both of which are incorporated herein by reference in their entireties.

BACKGROUND OF THE INVENTION

A vehicle having a driveline including a continuously variable transmission allows an operator of the vehicle or a control system of the vehicle to vary a drive ratio in a stepless manner, permitting a power source of the vehicle to operate at its most efficient rotational speed. Transmissions are becoming more complicated since the engine speed must be more precisely controlled to limit the fuel consumption and emissions of cars. Additionally transmission component speed and efficiency is equally important. Recently, continuously variable transmissions have been proposed to provide vehicles with continuously variable speed transmissions having designs that avoid high pinion and/or carrier speeds and other disadvantages of existing 3-mode power flows.

SUMMARY OF THE INVENTION

Provided herein is a front wheel drive or rear wheel drive continuously variable transmission comprising a stationary housing (ground), an input shaft, an output shaft, a gearset having first, second, third, and fourth rotating elements, a variator assembly having first and second rotating elements and three selectable torque transmitting devices ("clutches"); wherein the input shaft is fixedly connected with the first rotating element of the variator assembly, the second rotating element of the variator assembly is fixedly connected with the first element of the gearset, the output shaft is fixedly connected with the third element of the gearset; the first clutch connects the fourth element of the gearset to ground, establishing a first forward variable range of overall transmission speed ratios; the second clutch connects the input shaft to the second element of the gearset, establishing a second forward variable range of overall transmission speed ratios; the third clutch connects the second element of the gearset to ground, establishing a reverse variable range of overall transmission speed ratios; and wherein, the variator establishes a controlled, variable ratio between the speeds of its first and second rotating elements, thereby adjusting the overall transmission speed ratio within any of said variable ranges. In some embodiments, the gearset is a compound planetary gearset having rotating elements comprising a first ("single-pinion") planetary gearset comprising; a first ring gear, a first sun gear, and a first carrier assembly, and, a second ("double-pinion") planetary gearset having rotating elements comprising; a second ring gear, a second sun gear, and a second carrier assembly; wherein the first carrier assembly of the first planetary gearset rotatably supports a first single set of pinions which engage said single-pinion planetary gearset first ring gear and said single-pinion planetary gearset first sun gear; and, the second carrier assembly of the double-pinion planetary gearset rotatably supports, a second set of pinions which engage said double-pinion planetary gearset second sun gear, and a third set of pinions which engage said second set of pinions and said double-pinion planetary gearset second ring gear; and wherein, the first and second carrier assemblies of the first and second planetary gearsets are fixedly connected; the first ring gear of the first planetary gearset and the second ring gear of the second planetary gearset are fixedly connected and wherein, the first rotating element of the gearset is said first sun gear, the second rotating element of the gearset is said fixedly connected carrier assemblies, the third rotating element of the gearset is said fixedly connected ring gears, and the fourth rotating element of the gearset is said second sun gear. In some embodiments, the gearset is a compound planetary gearset comprising a ring gear, a carrier assembly rotatably supporting an outer set of long pinion gears in mesh with said ring gear and an inner set of short pinion gears in mesh with said outer set of long pinion gears, a first sun gear meshing with said outer set of long pinion gears, and a second sun gear meshing with said inner set of short pinion gears; and wherein, the first rotating element of the gearset is said first sun gear, the second rotating element of the gearset is said carrier assembly, the third rotating element of the gearset is said ring gear, and the fourth rotating element of the gearset is said second sun gear. In some embodiments, the gearset is a Ravigneaux compound planetary gearset. In some embodiments of the transmission the variator is a ball-type variator comprising; a carrier assembly rotatably supporting a plurality of pivoting axles rotatably disposed about the transmission axis, said pivoting axles each further rotatably supporting a ball; and wherein the first and second ring assemblies, each comprising a ball contact area in continuous contact with all of said balls, and wherein the first rotating element of the variator is said first ring assembly, the second rotating element of the variator is said second ring assembly; and the carrier assembly moves in controlled fashion through a small range of angles with respect to the variator housing in order to cause the pivoting axles to change orientation, thus changing the speed ratio between said first and second rings assemblies. In some embodiments of the transmission, as the variator speed ratio between the first and second assembly rings increases, the overall transmission speed ratio within said first forward range increases; the overall transmission speed ratio within said second forward range decreases; and the overall transmission speed ratio within said reverse range becomes more negative. In still other embodiments, the transmission having a variator speed ratio which is near the upper end of the variator speed ratio range but still within said range, may have overall transmission speed ratios in the first and second forward ranges that are the same; the second clutch can be synchronously engaged while in the first forward range; the first clutch can be synchronously engaged while in the second forward range; and an additional, fixed-ratio transmission operating mode, which transmits no power through the variator, is established by simultaneous application of the first and second clutches. In still other embodiments, the transmissions may further comprising a fourth clutch which selectably connects any two of said gearset's four rotating elements, thus causing all of said elements to rotate in unison, and establishing a third forward range.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
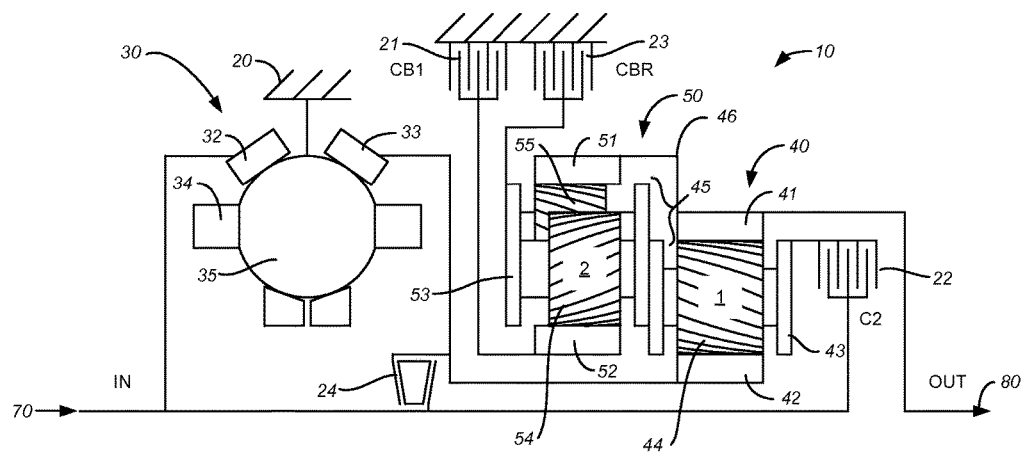
FIG. 1 is a stick diagram of a rear wheel drive embodiment of the 3-mode transmission as described herein.

The continuously variable transmission speed ratio can have the advantage of providing a smoother and continuous transition from a low speed ratio to a high speed ratio. However, the prior continuously variable transmissions can be more complex than would be ideal.

Continuously Variable Transmissions or CVTs are of many types: belts with variable pulleys, toroidal, and conical, for non-limiting example. The principle of a CVT is that it enables the engine to run at its most efficient rotation speed by changing steplessly the transmission ratio in function of the speed of the car and the torque demand (throttle position) of the driver. If needed, for example when accelerating, the CVT is configured to also shift to the most optimum ratio providing more power. A CVT is configured to change the ratio from the minimum to the maximum ratio without any interruption of the power transmission, as opposed to the opposite of usual transmissions which require an interruption of the power transmission by disengaging to shift from one discrete ratio to engage the next ratio.

Provided herein are configurations of CVTs based on a ball type variators, also known as CVP, for constant variable planetary. Basic concepts of a ball type Continuously Variable Transmissions are described in US2006084549 and AU2011224083A1, incorporated herein by reference in their entirety. Such a CVT, adapted herein as described throughout this specification, comprises a number of balls 997, depending on the application, two discs with a conical surface contact with the balls, as input 995 and output 996, and an idler 999 as shown on FIG. 7. The balls are mounted on axes 998, themselves held in a cage or carrier allowing changing the ratio by tilting the balls' axes. Other types of ball CVTs also exist, like the one produced by Milner, but are slightly different.

Figure 7:
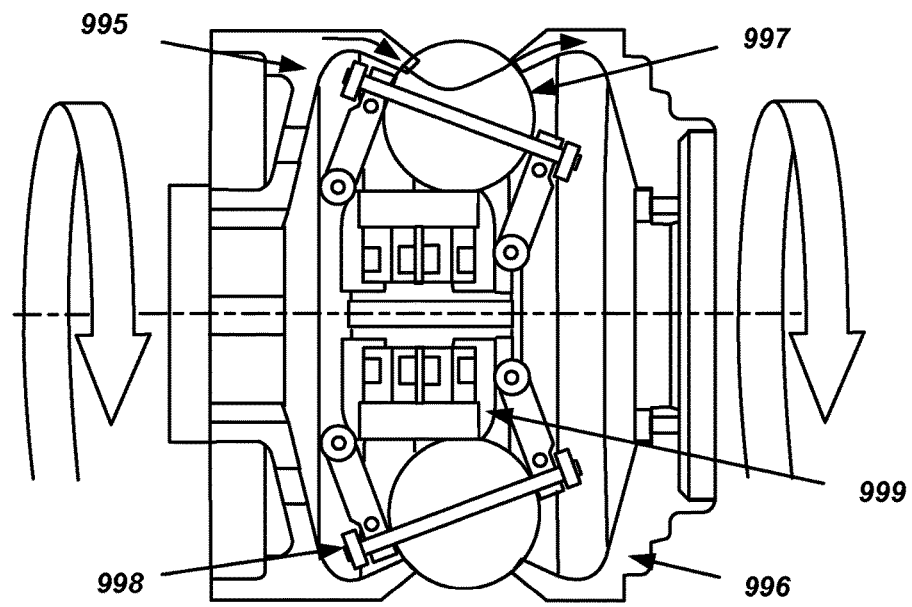
FIG. 7 is a side sectional view of a ball-type variator.
Figure 8:
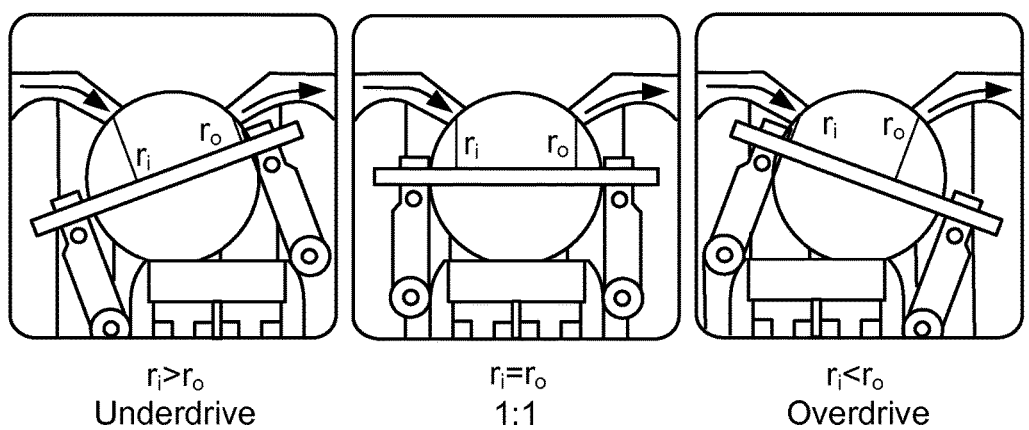
FIG. 8 is a magnified, side sectional view of a ball of a variator of FIG. 7 having a symmetric arrangement of a first ring assembly and a second ring assembly

The working principle of such a CVP of FIG. 7 is shown on FIG. 8. The CVP itself works with a fraction fluid. The lubricant between the ball and the conical rings acts as a solid at high pressure, transferring the power from the input ring, through the balls, to the output ring. By tilting the balls' axes, the ratio can be changed between input and output. When the axis is horizontal the ratio is one, when the axis is tilted the distance between the axis and the contact point change, modifying the overall ratio. All the balls' axes are tilted at the same time with a mechanism included in the cage.

Provided herein is a front wheel drive or rear wheel drive continuously variable transmission configured to optimize speed ratios to provide good, tunable overall ratios (OAR) and mode overlap, while avoiding the high pinion or carrier speeds and other disadvantages of existing 3-mode power flows.

Figure 3:
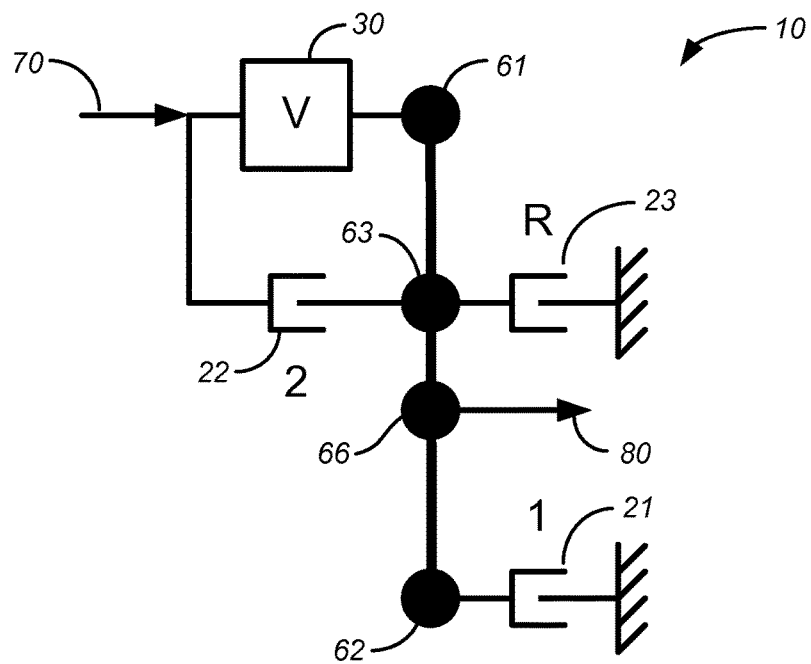
FIG. 3 is a lever diagram of an embodiment of the 3-mode transmission as described herein.

As shown in the lever diagram of FIG. 3, provided herein is a front wheel drive (or rear wheel drive) continuously variable transmission 10 comprising a stationary housing (ground), an input shaft 70, an output shaft 80, a gearset having first 61, second 63, third 66, and fourth 62 rotating elements, a variator assembly 30 having first and second rotating elements and three selectable torque transmitting devices ("clutches") 21, 22, 23; wherein the input shaft is fixedly connected with the first rotating element of the variator assembly 30, the second rotating element of the variator assembly is fixedly connected with the first element of the gearset 61, the output shaft 80 is fixedly connected with the third element 66 of the gearset; the first clutch 21 connects the fourth element of the gearset 62 to ground, establishing a first forward variable range of overall transmission speed ratios; the second clutch 22 connects the input shaft 70 to the second element of the gearset 63, establishing a second forward variable range of overall transmission speed ratios; the third clutch 23 connects the second element of the gearset 63 to ground, establishing a reverse variable range of overall transmission speed ratios; and wherein, the variator establishes a controlled, variable ratio between the speeds of its first and second rotating elements, thereby adjusting the overall transmission speed ratio within any of said variable ranges.

Figure 5:
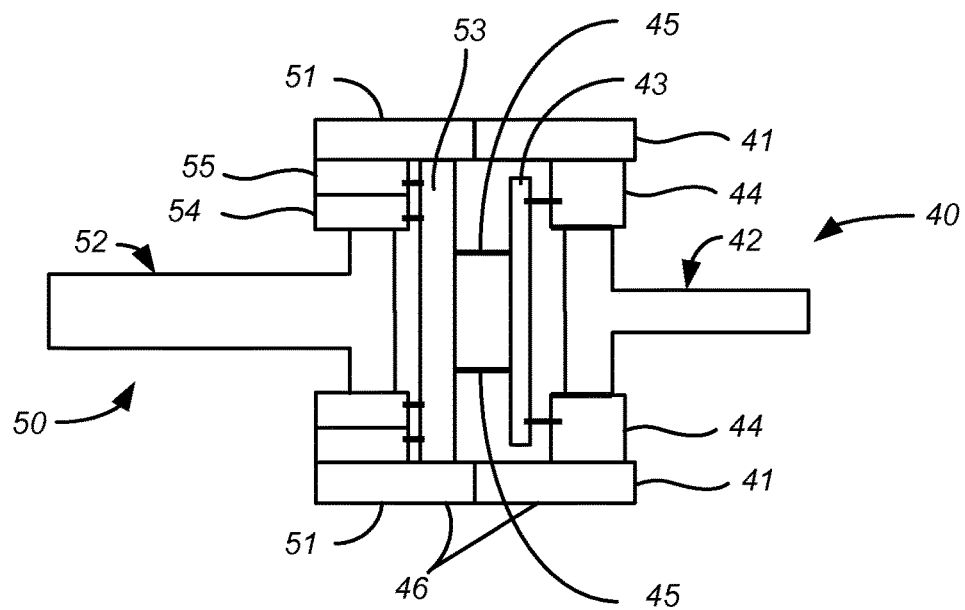
FIG. 5 is an alternate configuration view of the compound gear set of the 3-mode transmission.

In some embodiments, such as described in FIGS. 1 and 5, the gearset is a compound planetary gearset having rotating elements comprising a first ("single-pinion") planetary gearset 40 comprising; a first ring gear 41, a first sun gear 42, and a first carrier assembly 43, and, a second ("double-pinion") planetary gearset 50, having rotating elements comprising; a second ring gear 51, a second sun gear 52, and a second carrier assembly 53; wherein the first carrier assembly 43 of the first planetary gearset 40 rotatably supports a first single set of pinions 44 which engage said single-pinion planetary gearset first ring gear 41 and said single-pinion planetary gearset first sun gear 42; and, the second carrier assembly 53 of the double-pinion planetary gearset 50 rotatably supports, a second set of pinions 54 which engage said double-pinion planetary gearset second sun gear 52, and a third set of pinions 55 which engage said second set of pinions 54 and said double-pinion planetary gearset second ring gear 51; and wherein, the first and second carrier assemblies 43, 53 of the first and second planetary gearsets 40, 50 are fixedly connected 45; the first ring gear 41 of the first planetary gearset 40 and the second ring gear 51 of the second planetary gearset 50 are fixedly connected 46 and wherein, the first rotating element of the gearset is said first sun gear 42, the second rotating element of the gearset is said fixedly connected carrier assemblies 45, the third rotating element of the gearset is said fixedly connected ring gears 46, and the fourth rotating element of the gearset is said second sun gear 52.

Figure 2:
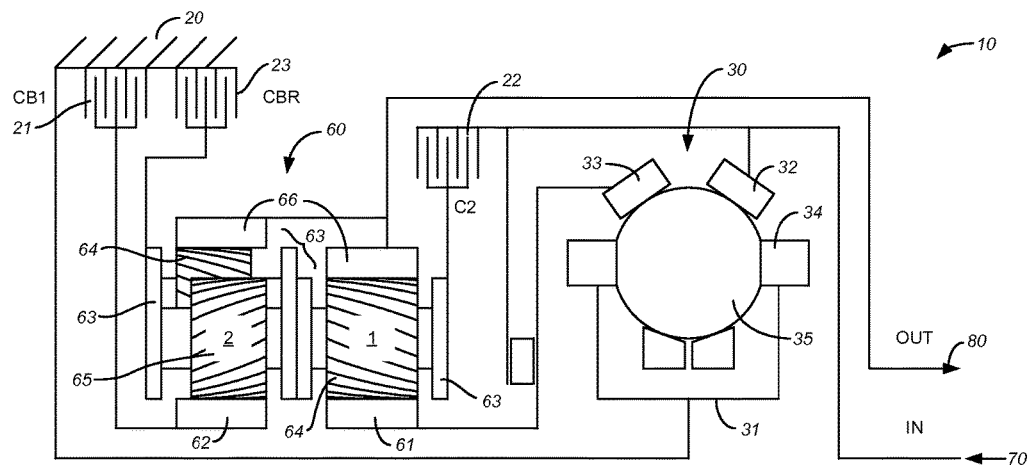
FIG. 2 is a stick diagram of a front wheel drive embodiment of the 3-mode transmission as described herein.
Figure 6:
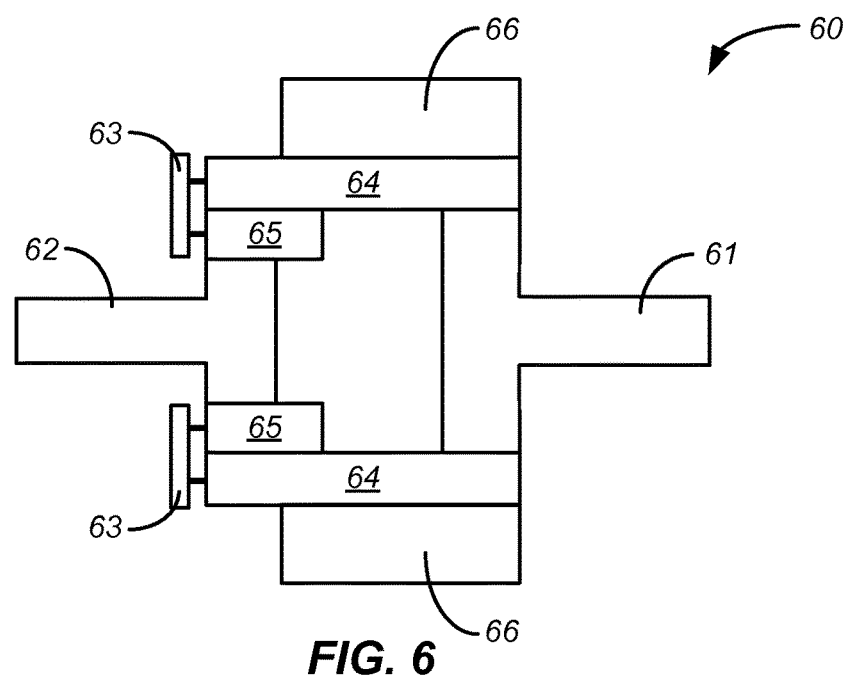
FIG. 6 is another alternate configuration view of the compound gear set of the 3-mode transmission.

In some embodiments, as shown in FIGS. 2 and 6, the gearset is a compound planetary gearset 60 comprising a ring gear 66, a carrier assembly 63 rotatably supporting an outer set of long pinion gears 64 in mesh with said ring gear 66 and an inner set of short pinion gears 65 in mesh with said outer set of long pinion gears 64, a first sun gear 61 meshing with said outer set of long pinion gears 64, and a second sun gear 62 meshing with said inner set of short pinion gears 65; and wherein, the first rotating element of the gearset is said first sun gear 61, the second rotating element of the gearset is said carrier assembly 63, the third rotating element of the gearset is said ring gear 66, and the fourth rotating element of the gearset is said second sun gear 62. In some embodiments, the gearset 60 is a Ravigneaux compound planetary gearset.

As illustrated in FIG. 7, a variator is a system that uses a set of rotating and tilting balls in a carrier that is positioned between an input ring and an output ring. Tilting the balls changes their contact diameters and varies the speed ratio. Contacting a rotating sphere at two different locations relative to the sphere's rotational axis will provide a "gear ratio", which can range from underdrive to overdrive depending on the location of the contact points for input and output torque and speed. As a result, the variator system offers continuous transition to any ratio within its range. The gear ratio is shifted by tilting the axes of the spheres in a continuous fashion, to provide different contact radii, which in turn drive the input and output rings, or discs.

The variator, as noted above, has multiple balls to transfer torque through multiple fluid patches. The balls are placed in a circular array around a central idler (sun) and contact separate input and output traction rings at engagement points about the balls. This configuration allows the input and output to be concentric and compact. The result is the ability to sweep the transmission through the entire ratio range smoothly, while in motion, under load, or stopped.

The variator itself works with a traction fluid. The traction fluid is located in the variator for lubrication and traction. When this fluid undergoes high contact pressures under rolling contact between the two very hard elements, the balls and the rings, the fluid undergoes a near-instantaneous phase transition to an elastic solid. This is also known as elasto-hydrodynamic lubrication (EHL). Within this patch of traction the molecules of the fluid stack up and link to form a solid, through which shear force and thus torque can be transferred. Note that the rolling elements are actually not in physical contact when the elements are rotating.

The lubricant between the ball and the conical rings acts as a solid at high pressure, transferring the power from the first ring assembly 32 (input of the variator), through the variator balls 35, to the second ring assembly 33 (output of the variator). As illustrated in FIG. 8, by tilting the variator balls' axes 34, the ratio is changed between input and output. When the axis of each of the variator balls is horizontal the ratio is one, when the axis is tilted the distance between the axis and the contact point change, modifying the overall ratio, between underdrive and overdrive. All the variator balls' axles are tilted at the same time and same angle with a mechanism included in the cage.

The embodiments of the present invention as described herein will find many applications. For example, although reference is made to vehicular applications, the continuously variable transmission as described herein can be used in many applications such as bicycles, motorized vehicles, wind turbines, and power tools, for example. The embodiments of the present invention as described herein will find applications in front-wheel drive or rear-wheel drive transmissions for both On- and Off-highway vehicles.

As previously described and now shown in FIGS. 1 and 2, in some embodiments of the CVP transmission 10, the variator is a ball-type variator 30 comprising; a carrier assembly 31 rotatably supporting a plurality of pivoting axles 34 rotatably disposed about the transmission axis, said pivoting axles 34 each in turn further rotatably supporting a ball 35; and wherein the first and second ring assemblies 32, 33, each comprising a ball contact area in continuous contact with all of said balls. The first rotating element of the variator is first ring assembly 32, the second rotating element of the variator is said second ring assembly 32; and the carrier assembly 31 moves in controlled fashion through a small range of angles as previous illustrated in FIG. 8, with respect to the variator housing in order to cause the pivoting axles 34 to change orientation, thus changing the speed ratio between said first and second rings assemblies.

In some embodiments of the transmission, as the variator speed ratio between the first and second assembly rings increases, the overall transmission speed ratio within said first forward range increases; the overall transmission speed ratio within said second forward range decreases; and the overall transmission speed ratio within said reverse range becomes more negative. In still other embodiments, the transmission, having a variator speed ratio which is near the upper end of the variator speed ratio range but still within said range, may have overall transmission speed ratios in the first and second forward ranges that are the same; wherein the second clutch can be synchronously engaged while in the first forward range; the first clutch can be synchronously engaged while in the second forward range; and an additional, fixed-ratio transmission operating mode, which transmits no power through the variator, is established by simultaneous application of the first and second clutches. The fixed ratio operating mode is further describes as the intersection of the 1st and 2nd modes; wherein, if both clutches 1 and 2 are locked, then the variator in theory doesn't need to transmit any power.

Figure 4:
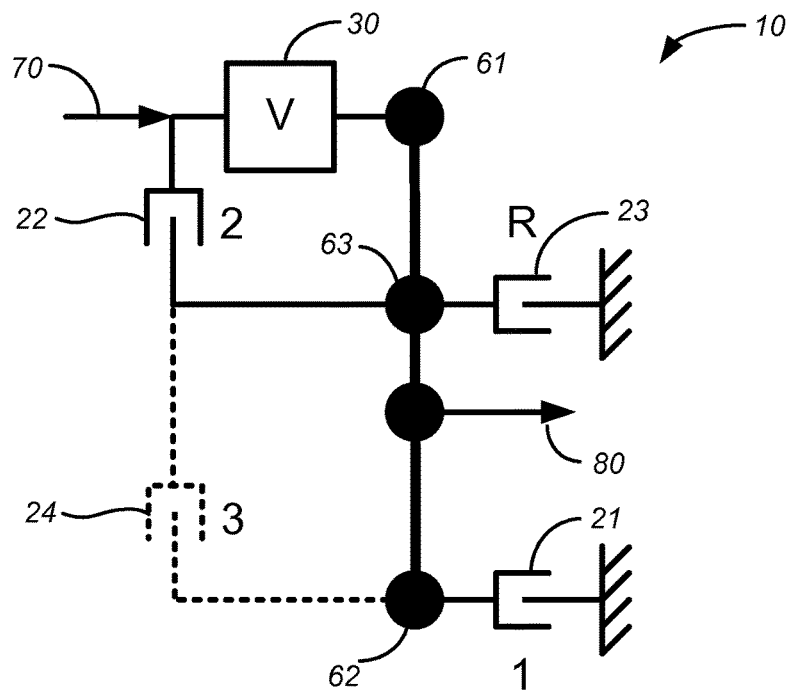
FIG. 4 is a lever diagram of another embodiment of the 3-mode transmission showing an optional sync clutch, as described herein.

In still other embodiments, as illustrated in FIGS. 1 and 4, the transmissions may further comprise an optional fourth clutch 24 which selectably connects any two of the gearset's four rotating elements, thus causing all of said elements to rotate in unison, and establishing a third forward range. When engaged, the entire gearset rotates as a single unit, and thus causing the transmission output speed to be equal to the variator output speed, extending the transmission overall ratio, and passing all of the input power through the variator to the ring gear in a pure CVP range between 0.5 and 1.8. Like the first forward and reverse modes, this optional third mode passes all of the input power through the variator, so it is not generally as efficient as the second mode, but allows higher transmission output speed ratios.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A continuously variable transmission comprising:
a stationary housing;
an input shaft;
an output shaft;
a gearset having a first rotating element, a second rotating element, a third rotating element, and a fourth rotating element;
a variator assembly having a first ring assembly and a second ring assembly;
a first clutch capable of engaging the fourth rotating element to the stationary housing;
a second clutch capable of engaging the input shaft to the second rotating element; and
a third clutch capable of engaging the second rotating element to the stationary housing;
wherein
the input shaft is fixedly connected with the first ring assembly, the second ring assembly is fixedly connected with the first rotating element,
the output shaft is fixedly connected with the third rotating element, engagement of the first clutch establishes a first forward variable range within an overall transmission speed ratio,
engagement of the second clutch establishes a second forward variable range within the overall transmission speed ratio,
engagement of the third clutch establishes a reverse variable range within the overall transmission speed ratio, and
the variator controls a variable speed ratio between speeds of the first ring assembly and the second ring assembly, thereby adjusting the overall transmission speed ratio within any of the first forward variable range, the second forward variable range or the reverse variable range.

2. The transmission of claim 1, wherein the gearset is a compound planetary gearset,
wherein the third rotating element is a ring gear,
wherein the second rotating element is a carrier assembly rotatably supporting an outer set of long pinion gears meshing with the ring gear and an inner set of short pinion gears meshing with the outer set of long pinion gears,
wherein the first rotating element is a first sun gear meshing with the outer set of long pinion gears, and
wherein the fourth rotating element is a second sun gear meshing with said the inner set of short pinion gears.

3. The transmission of claim 1, wherein the gearset is a Ravigneaux compound planetary gearset.

4. The transmission of claim 1, wherein the variator assembly is a ball-type variator assembly comprising;
a carrier assembly rotatably supporting a plurality of pivoting axles rotatably disposed about the transmission axis, the pivoting axles each rotatably supporting a ball;
wherein the first ring assembly and the second ring assembly each comprising a ball contact area in continuous contact with each of the balls, and
wherein the carrier assembly moves in a controlled fashion through a range of angles in order to cause the pivoting axles to change orientation, thus varying the variable speed ratio between the first ring assembly and the second ring assembly.

5. The transmission of claim 4, wherein, as the variable speed ratio increases,
the overall transmission speed ratio within the first forward variable range increases;
the overall transmission speed ratio within the second forward variable range decreases; and
the overall transmission speed ratio within the reverse variable range decreases.

6. The transmission of claim 5, wherein when the variable speed ratio is within a variable speed ratio range;
the overall transmission speed ratio in the first forward variable range and the second forward variable range is the same;
the second clutch can be synchronously engaged while in the first forward variable range;
the first clutch can be synchronously engaged while in the second forward variable range; and
a fixed-ratio transmission operating mode which transmits no power through the variator is established by simultaneous application of the first clutch and second clutch.

7. The transmission of claim 6, wherein said second clutch is a dog clutch.

8. The transmission of claim 1, further comprising a fourth clutch which selectably connects any two of the gearset's rotating elements, thus causing all of the rotating elements to rotate in unison, and establishing a third variable forward range.

9. The transmission of claim 8, wherein the fourth clutch is a dog clutch.

10. The transmission of claim 1, wherein the first clutch and the third clutch are braking clutches.

11. The transmission of claim 1 wherein the transmission is capable of being utilized in both front wheel drive and rear wheel drive vehicles.

12. The transmission of claim 1 wherein the variator comprises a traction fluid.

13. A vehicle comprising the transmission of claim 1.

14. A method comprising providing a vehicle comprising the transmission of claim 13.

* * * * *